Oct. 7, 1941.  P. S. DENNING  2,258,176
REMOVABLE INSULATING UNIT FOR PIPE COUPLINGS AND THE LIKE
Filed Aug. 13, 1938
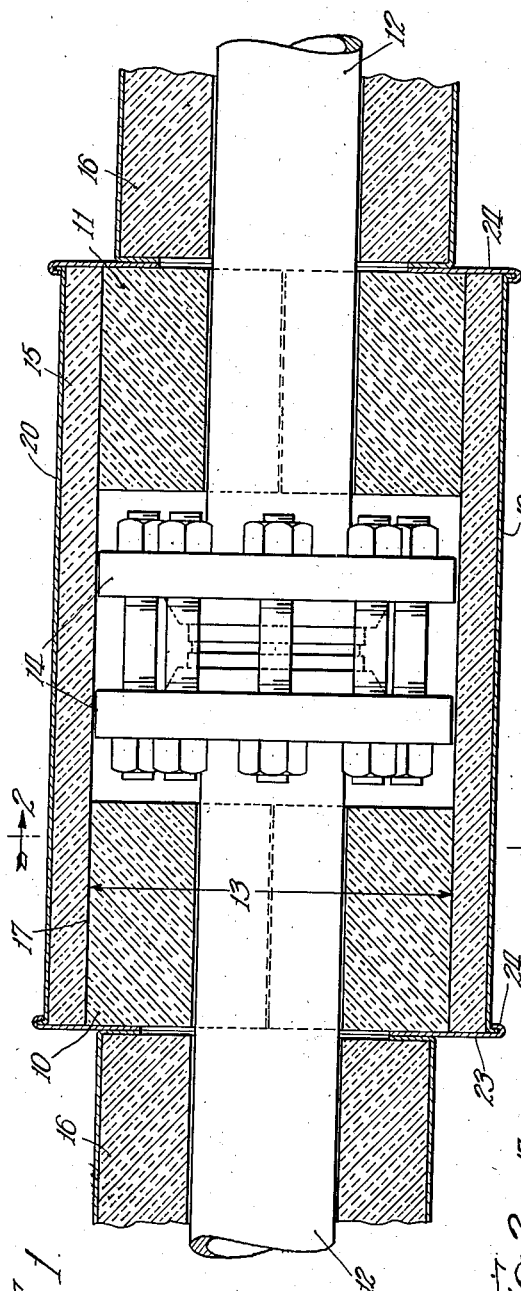
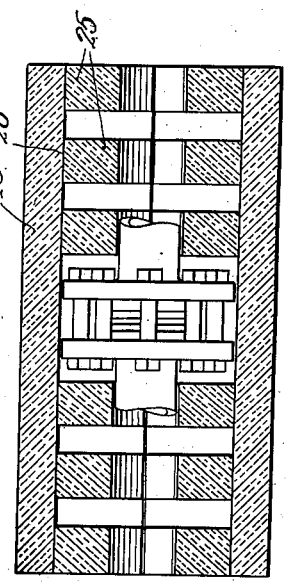
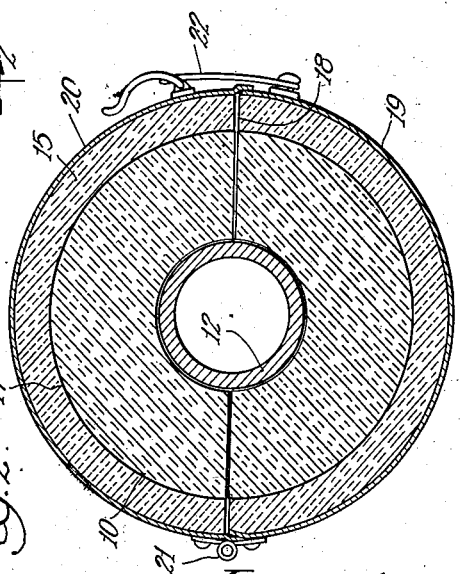
Inventor
Paul S. Denning
By Roland C. Rehm Atty Patented Oct. 7, 1941

2,258,176

UNITED STATES PATENT OFFICE 2,258,176

REMOVABLE INSULATING UNIT FOR PIPE COUPLINGS AND THE LIKE

Paul S. Denning, Joliet, Ill., assignor to F. E. Schundler & Co., Inc., Joliet, Ill., a corporation of Illinois Application August 13, 1938, Serial No. 224,659

1 Claim. (Cl. 154—44)

This invention relates to insulation of pipe couplings and the like and, among other objects, aims to provide a durable insulating unit which may without damage be repeatedly removed and replaced to permit periodic access to the coupling, joint, etc.

The nature of the invention may be readily understood by reference to one illustrative construction embodying the invention and shown in the accompanying drawing.

In said drawing:

Fig. 1 is a longitudinal section through a flanged pipe coupling and the removable insulating covering;

Fig. 2 is a transverse section taken on the plane 2—2 of Fig. 1; and

Fig. 3 is a section similar to Fig. 1 illustrating an insulating unit for large diameter fittings.

In certain industries it is necessary periodically to inspect or dismantle couplings, etc., in pipe lines; and heretofore it has been the practice to omit insulation at the couplings, etc., rather than assume the expense of destroying and replacing the plastic insulation which has customarily been placed over various pipe fittings. It has been found however that the change in temperature at the exposed coupling produces undesirable results. For example, in hot oil vapor lines in the petroleum industry wherein periodic dismantling of the couplings is necessary for inspection and cleaning of the pipes, there occurs serious pipe erosion caused by impact and friction of drops of oil resulting from condensation of oil vapor in the cooler regions at the exposed couplings. This erosion may be prevented by properly insulating the couplings.

The illustrative unit represents one form of efficient removable insulation for flanged pipe couplings. It comprises annular sections 10 and 11 whose internal diameter is slightly larger than the outside diameter of the pipe 12 and whose outside diameter 13 is approximately that of the outside diameter of the coupling flanges 14. The annular sections 10 and 11 are formed in halves and are joined by a surrounding tubular section 15 whose inside diameter is that of the outside diameter of the sections 10 and 11 and whose length is sufficient to embrace the uncovered portion of pipe between the ends of the conventional coverings 16. Preferably the units 10 and 11 are united in spaced relation to the inner surfaces 17 of the tubular section 15 by an appropriate adhesive, such as sodium silicate. Sections 10 and 11 and the tubular section 15 are preferably divided in halves along an axial plane 18 to permit easy application around the pipe coupling. A protective metal covering in this instance formed in semi-cylindrical sections 19 and 20 hinged together at 21 surrounds the unit. The opposite edges of the cover sections are provided with appropriate locking means, such as toggle clamps 22, similar to light suitcase clamps. The halves of the insulating units are preferably cemented to the inner faces of the respective cover halves 19 and 20 by a cement such as sodium silicate. The ends of the units are also preferably covered by semi-annular sheet metal plates 23 beaded over at 24 or otherwise appropriately connected to the cover sections 19 and 20 respectively.

By releasing the clamps 22 the insulating cover may be quickly removed without damage to expose the coupling or other pipe fitting whenever inspection or cleaning of the pipe is necessary.

For large diameter pipes of 6" and over, the sections 10 and 11 may advantageously be lightened by formation in spaced semi-annular discs 25 cemented in spaced relation along their outer surfaces 26 to the inside of the respective halves of the outer section 15 (see Fig. 3). As here shown, three such annular discs spaced from 1½" to 2" apart are employed on each side of the coupling. The thickness of the discs may vary depending upon whether the pipe is subject to little or much vibration. For heavily vibrating or throbbing pipe lines, the discs should be made thicker; and indeed may be made as solid as the sections 10 and 11, better to withstand the vibration.

The insulating material used for the units possesses unique characteristics; and it is the only material I have been able to discover possessing these characteristics. It has a high insulating efficiency and unlike most efficient insulators is capable of withstanding and maintaining its efficiency at temperatures of 900° F. and higher; it possesses sufficient strength to withstand the rather severe usage to which the unit is subjected. This material comprises granules of exfoliated vermiculite bonded together with a small amount of magnesium oxysulphate cement. Exfoliated vermiculite is a biotite type of mica capable of exfoliating when heated to produce a lightweight material (about 4 pounds per cubic foot) which is refractory and possesses a high insulating efficiency. The multitude of slightly spaced highly polished laminae comprising the exfoliated vermiculite function efficiently at high temperatures to resist transmission of radiant heat.

Magnesium oxysulphate cement is formed by combining magnesium sulphate solution with magnesium oxide. It is from 2½ to 3 times as strong as Portland or high alumina cements and unexpectedly is capable of withstanding very high temperatures, commencing to break down at about 1800° F. Because of its strength, it can be used in much smaller amounts than other cements, thereby producing a much more efficient insulating material. The efficiency of a cement bonded insulating material depends very greatly on the amount of cement used.

If the cementitious insulating material be formed with the use of suction or centrifugal force to expel the excess liquid, it is possible to use as little as one part by volume of cement to twenty-five to thirty parts of exfoliated vermiculite. Preferably a small amount of fibrous asbestos is used in the mixture to maintain a uniform distribution of the small amount of cement throughout the mass and to prevent its segregation during the removal of excess liquid by the application of centrifugal force or suction. To secure uniform distribution of the small amounts of magnesium oxide and asbestos throughout the exfoliated vermiculite, the mixture is preferably made up in the form of a slurry utilizing a considerable excess of magnesium sulphate solution of about 5° to 10° Bé. The excess magnesium sulphate solution subsequently withdrawn by suction or centrifugal force may, of course, be used again.

While the insulation may be molded to shape I have been able to produce a much more accurately made unit by turning the various units to size. The material is admirably adapted to turning and may be turned and cut very accurately. It is thus possible to work to very close dimensions and form tightly fitting joints.

The resulting insulating material is exceptionally durable and at the same time possesses an insulating efficiency at high temperatures equaled in no high temperature insulation regardless of matter of strength. At temperatures of 800° to 900° F. the K factor of this material is approximately .8 or .9. Many pipe lines, particularly those in the oil industry, reach temperatures of 900° F. The conventional magnesia pipe insulation is incapable of resisting temperatures exceeding 600° F.

Obviously the invention is not limited to the details of the illustrative construction since these may be variously modified. Moreover, it is not indispensable that all features of the invention be used conjointly since various features may be used to advantage in different combinations and sub-combinations.

Having described my invention, I claim:

An insulating unit for pipe and associated pipe couplings comprising insulating material which can be machined to exact size and which is capable of withstanding temperatures in excess of 600° F., said insulating material comprising exfoliated vermiculite bonded together by cement capable of withstanding temperatures in excess of 600° F., the volume of which cement is about one twenty-fifth of that of the vermiculite, the insulating material comprising inner and outer semi-cylindrical sections, the inner sections conforming in size to the pipe and located adjacent opposite side of the coupling, the outer sections surrounding the coupling and in contact with the said inner sections, the contacting surfaces of said inner and outer sections being finished for accurately fitting engagement and being cemented together to provide a pair of semi-cylindrical parts for surrounding the coupling, said parts respectively having a protective covering on their exterior.

PAUL S. DENNING.